Dec. 10, 1957 M. WATTER 2,815,948
ARTICLE TRANSFER OR HANDLER MEANS, ESPECIALLY
FOR FEEDING SHEETS
Filed April 5, 1955 16 Sheets-Sheet 1
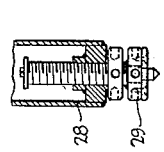
FIG.1a
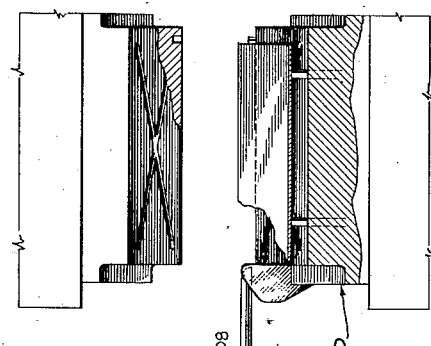
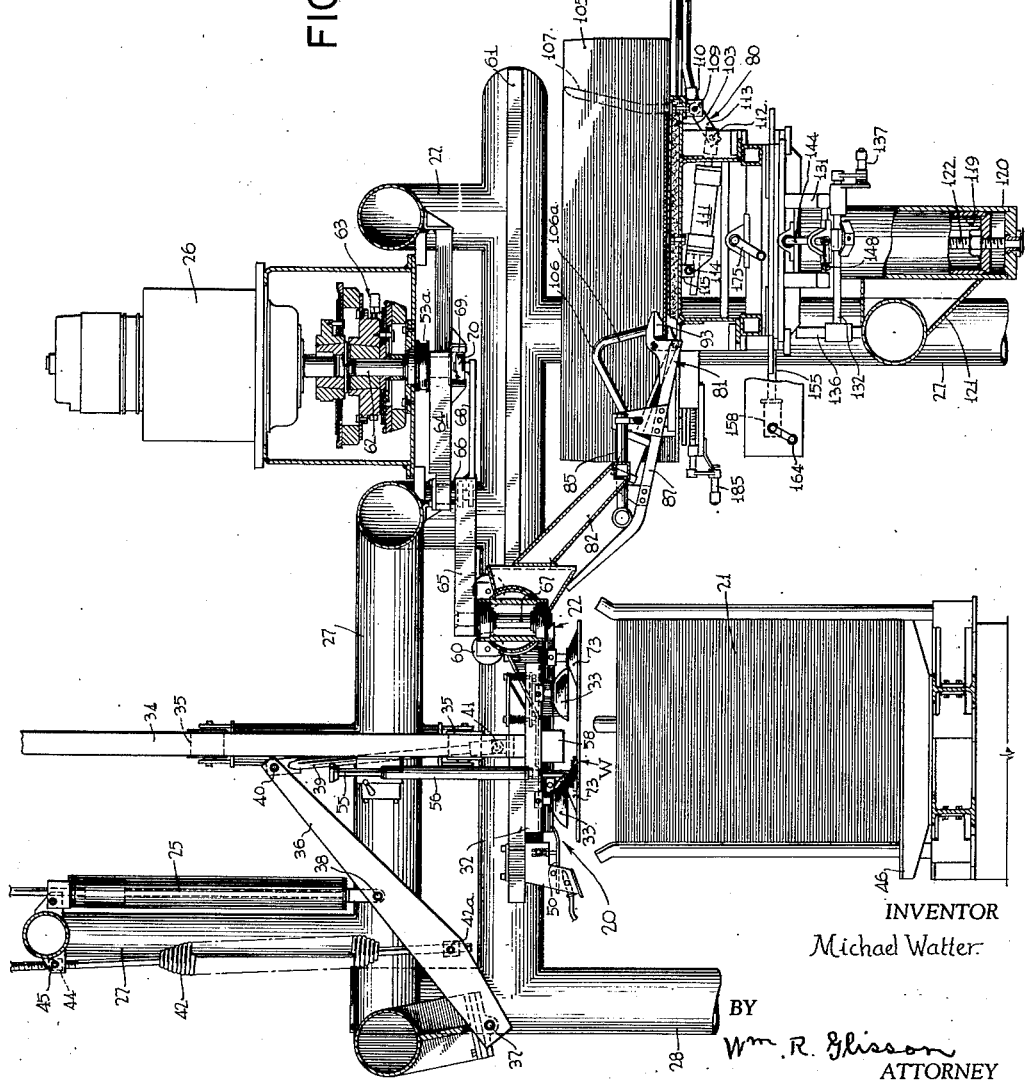
FIG.1
INVENTOR
Michael Watter
BY
Wm. R. Glisson
ATTORNEY Dec. 10, 1957 M. WATTER 2,815,948
ARTICLE TRANSFER OR HANDLER MEANS, ESPECIALLY
FOR FEEDING SHEETS
Filed April 5, 1955 16 Sheets-Sheet 6

INVENTOR
Michael Watter
BY Wm. R. Ghisson
ATTORNEY

INVENTOR
Michael Watter.
BY
Wm. R. Glisson
ATTORNEY

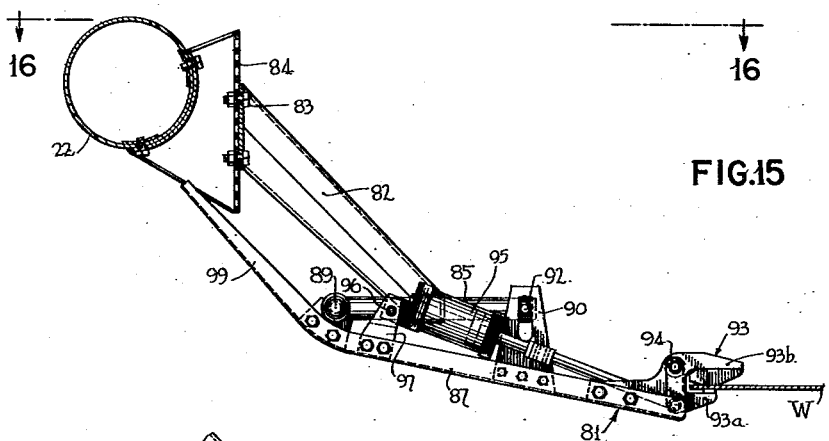
FIG.15
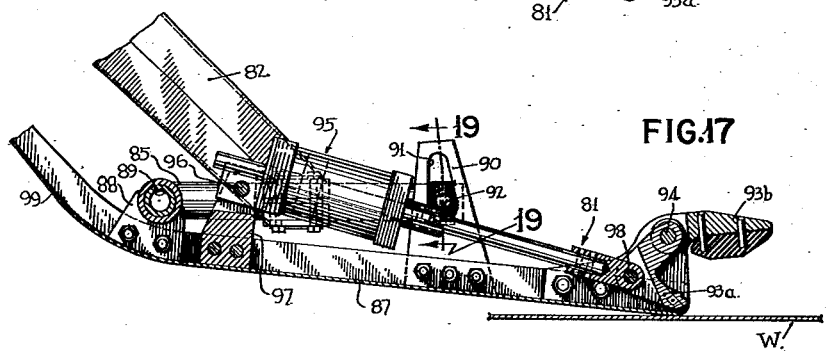
FIG.17
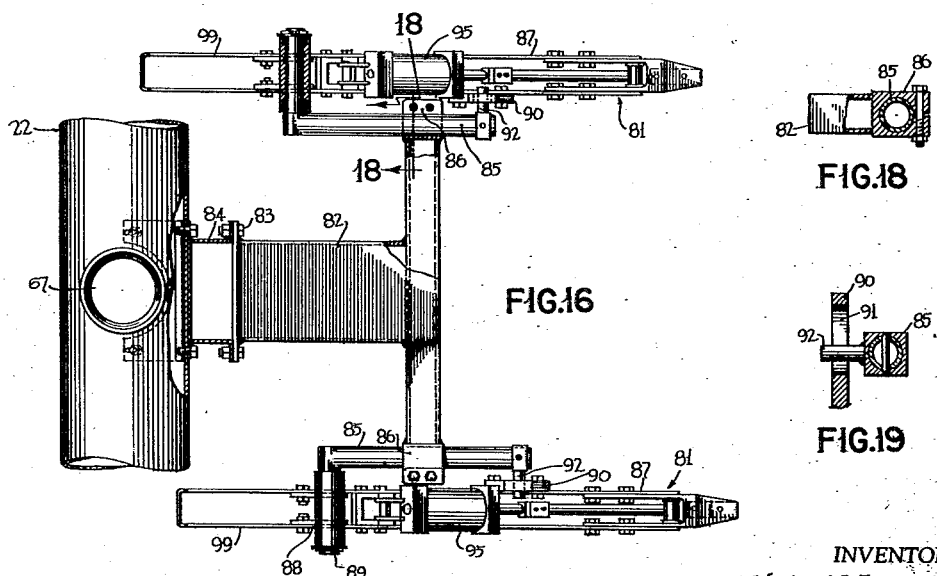
FIG.16
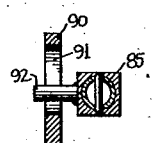
FIG.18
FIG.19
INVENTOR
Michael Watter
BY Wm. R. Glisson
ATTORNEY

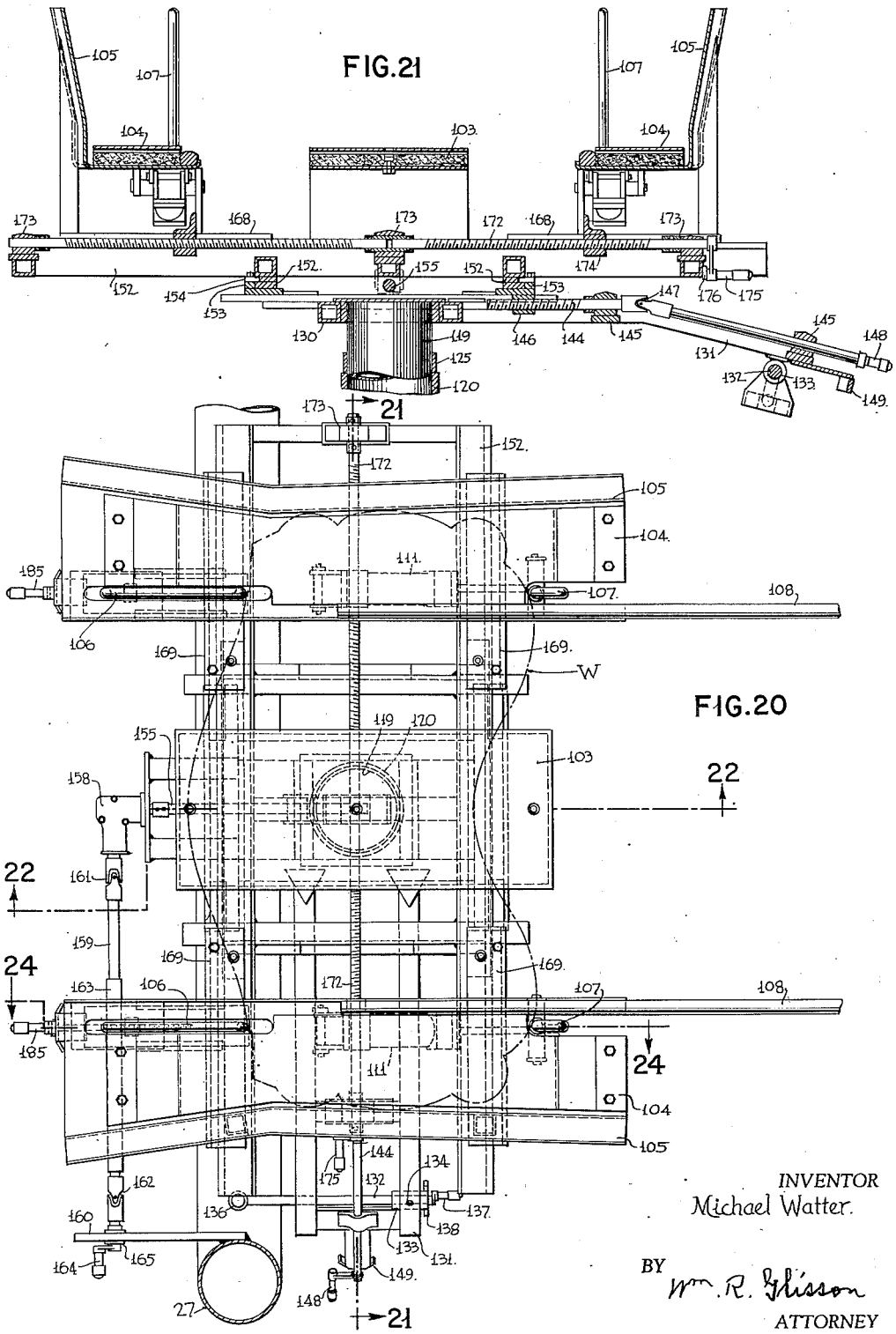

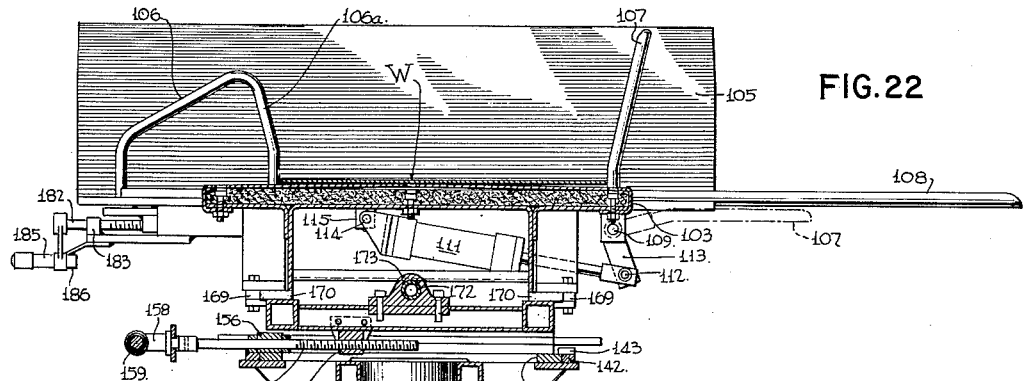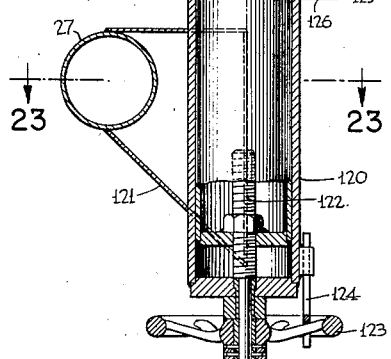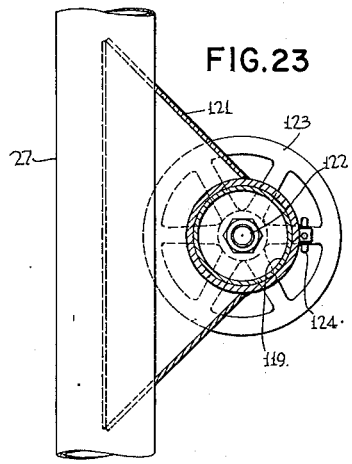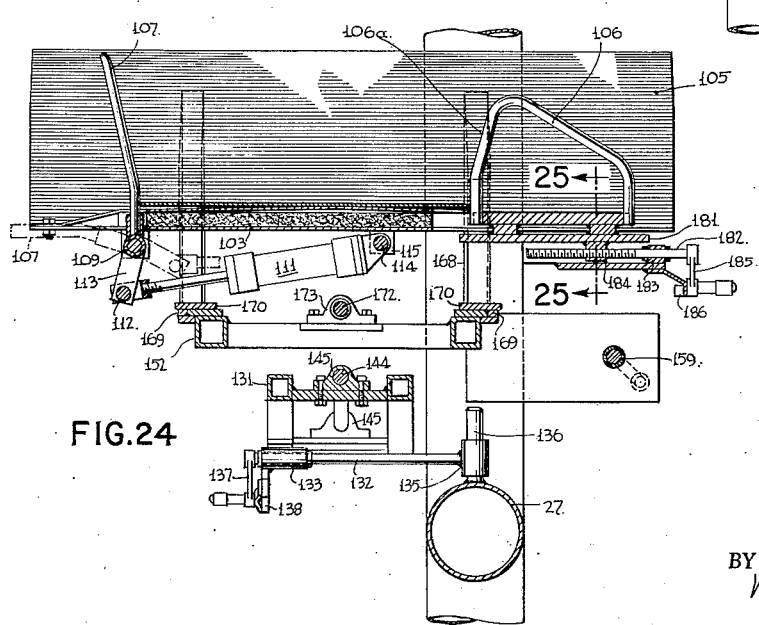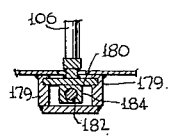

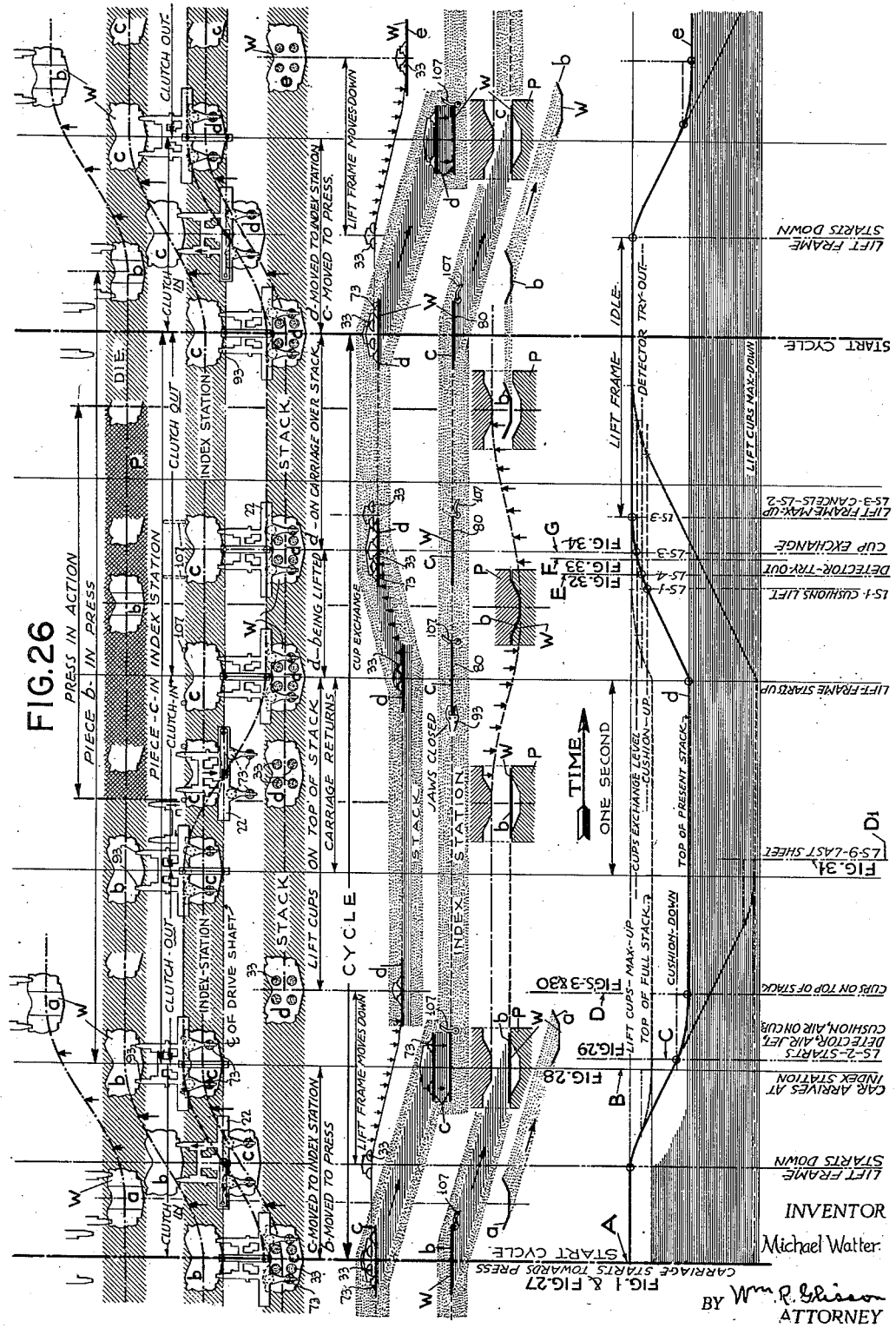

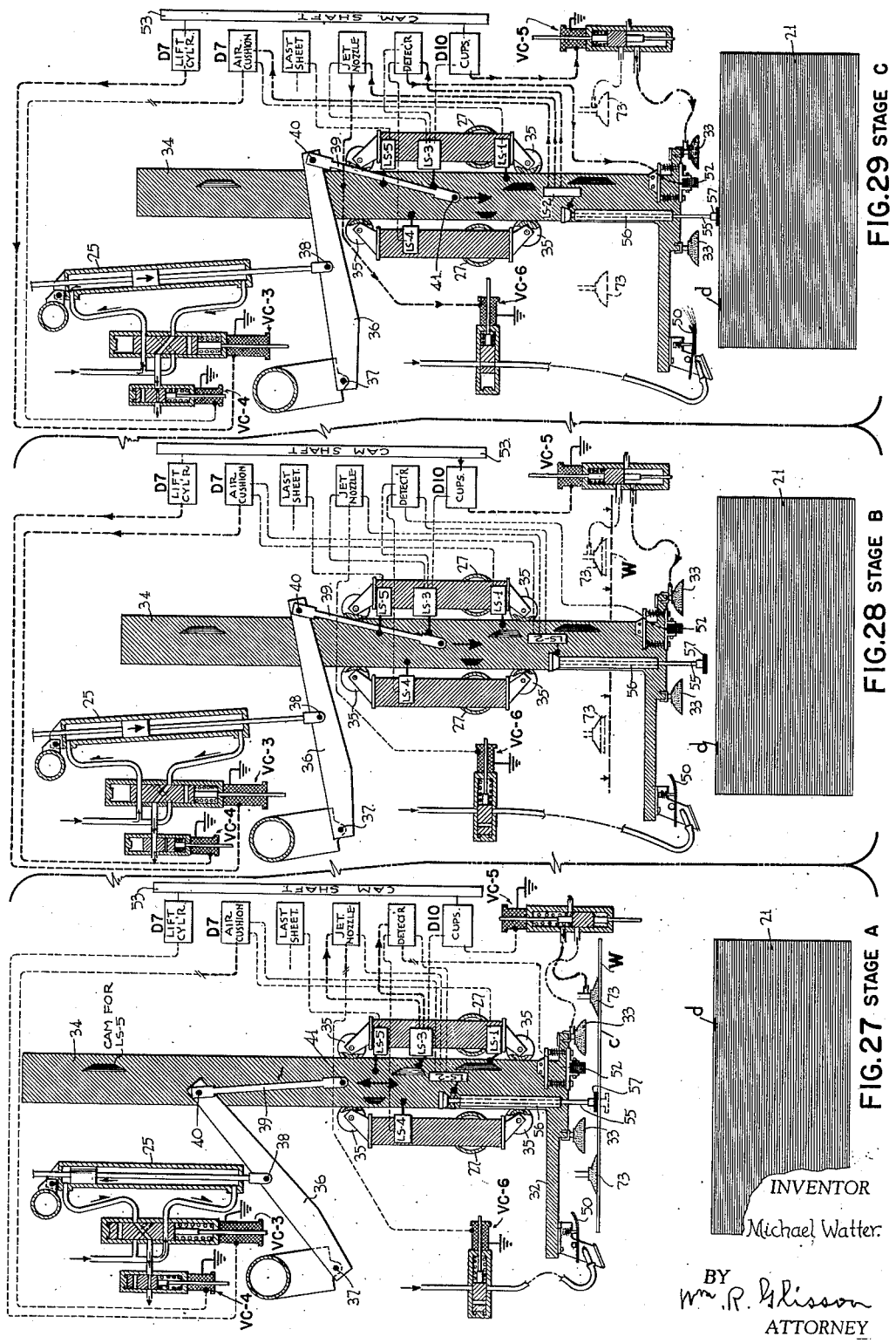

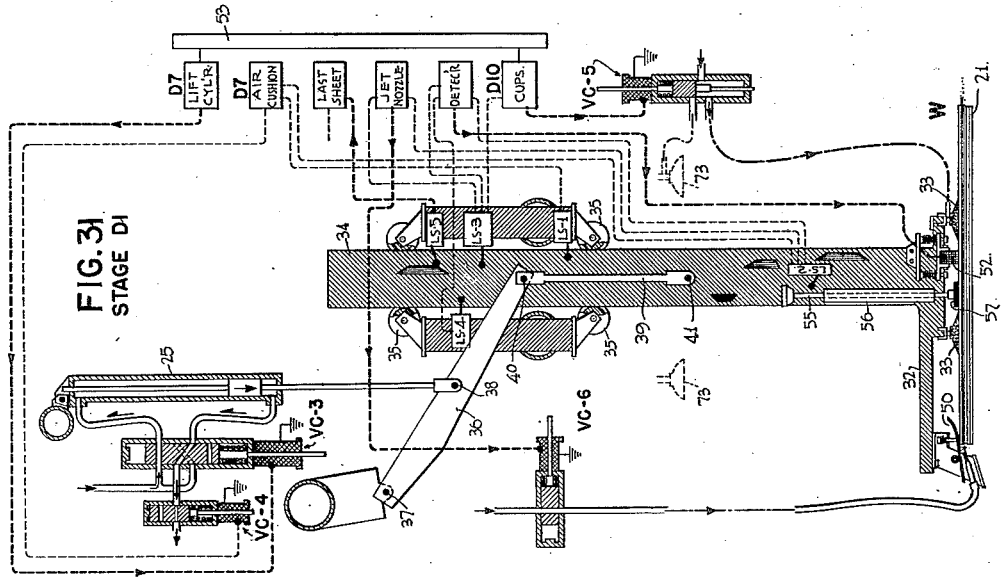
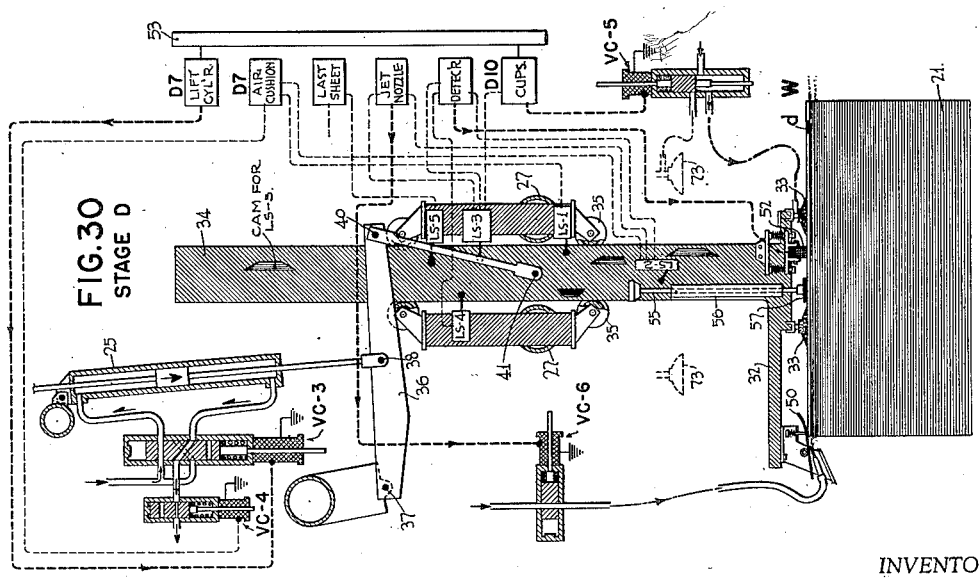

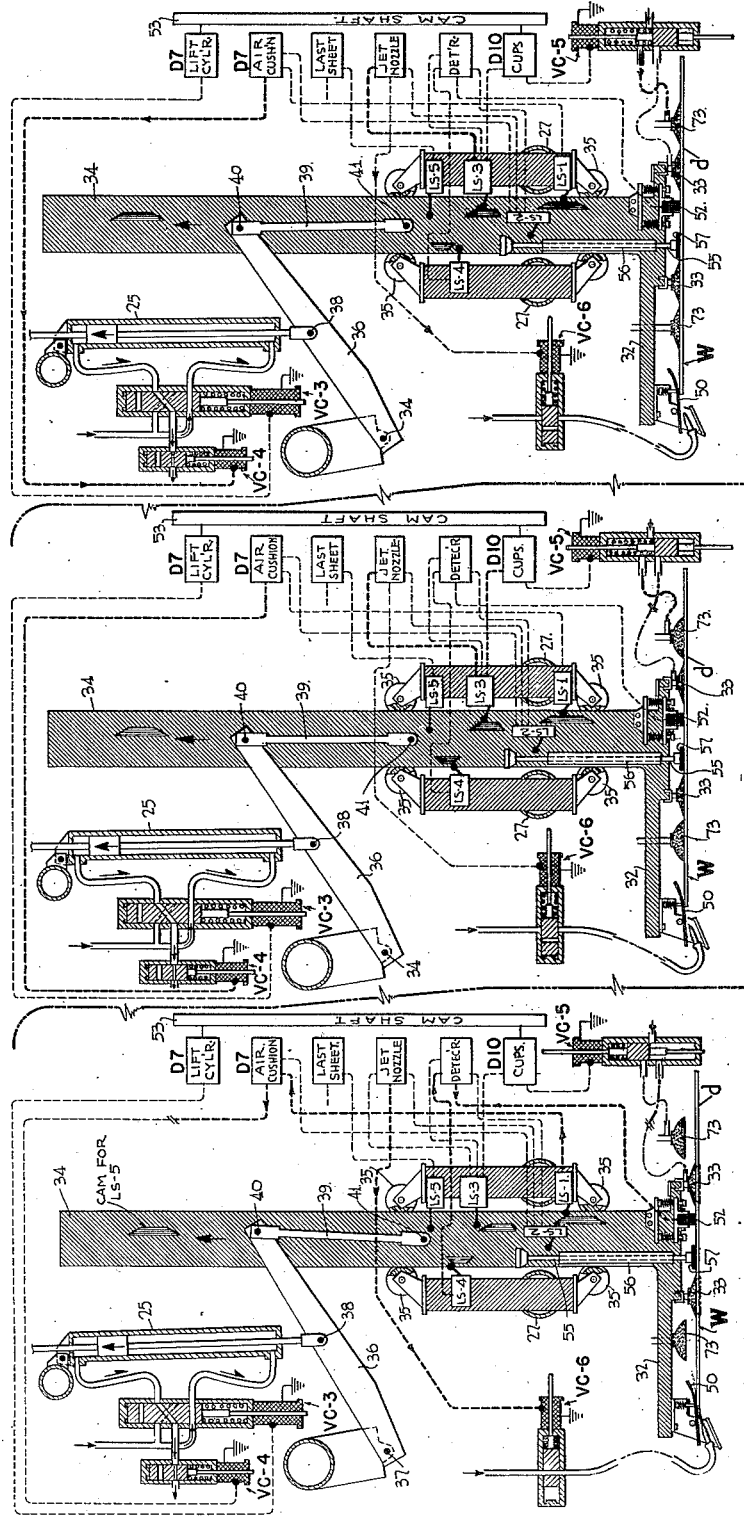

United States Patent Office 2,815,948
Patented Dec. 10, 1957

2,815,948

ARTICLE TRANSFER OR HANDLER MEANS, ESPECIALLY FOR FEEDING SHEETS

Michael Watter, Philadelphia, Pa., assignor to The Budd Company, Philadelphia, Pa., a corporation of Pennsylvania Application April 5, 1955, Serial No. 499,323

10 Claims. (Cl. 271—14)

This invention relates to article transfer or handler means, especially for feeding sheets, and has for an object the provision of improvements in this art.

The present invention is in certain particulars an improvement upon the inventions disclosed in my copending applications Serial No. 304,578, filed August 15, 1952, now Patent No. 2,743,923, and Serial No. 394,397, filed November 25, 1953, now Patent No. 2,711,101, June 21, 1955.

One of the particular objects of the invention is to provide independently powered devices for moving an article in different paths and transferring it enroute from one device to the other.

Another object is to provide improved means for very rapidly moving an article and cushioning its action at each end of its stroke.

Another object is to provide improved means for controlling the separation of sheets.

Another object is to provide improved means for controlling a sheet detector.

Another object is to provide improved means for transferring a sheet from one sheet-moving means to another.

Another object is to provide improved means for moving a reciprocating carriage.

Another object is to provide improved means for holding an article in an intermediate position in which it is first deposited and then taken again by the moving means.

Another object is to provide improved means for assuring that an article is fed forward and that it is fed in proper orientation.

The above and other objects and advantages of the invention will be apparent from the following description of an exemplary embodiment, reference being made to the accompanying drawings thereof, wherein:

Fig. 1 is a vertical longitudinal section and elevation of apparatus embodying the invention;

Fig. 1a shows a leg support detail;

Fig. 2a is an enlarged vertical section of a detail taken on the line 2a—2a of Fig. 2;

Fig. 9 is a partial vertical section taken on the line 9—9 of Fig. 4;

Fig. 10 is a partial vertical section taken on the line 10—10 of Fig. 4;

Fig. 15 is an enlarged side elevation and section of sheet-feeding grippers shown in Fig. 1;

Fig. 16 is a plan view of the gripper-feeding mechanism as viewed from the line 16—16 of Fig. 15;

Fig. 17 is a further enlarged side elevation and section showing the gripper feeding mechanism at another stage of operation;

Fig. 18 is a section of a detail taken on the line 18—18 of Fig. 16;

Fig. 19 is a section of a detail taken on the line 19—19 of Fig. 15;

Fig. 20 is an enlarged plan view of mechanism at a workpiece control or index station shown in Fig. 2;

Fig. 21 is a vertical section taken on the line 21—21 of Fig. 20;

Fig. 22 is a vertical section taken on the line 22—22 of Fig. 20;

Fig. 23 is a horizontal section taken on the line 23—23 of Fig. 22;

Fig. 24 is a vertical section taken on the line 24—24 of Fig. 20;

Fig. 25 is a vertical section of a detail taken on the line 25—25 of Fig. 24;

Fig. 26 is a flow diagram to show the operation of the apparatus;

Fig. 27 is a parts diagram showing the position at the starting stage "A" of Fig. 26, this being a rest or pause position between cycles;

Fig. 28 is a view like Fig. 27 showing the parts at the "B" stage of Fig. 26;

Fig. 29 is a view like Fig. 27 showing the parts at the "C" stage of Fig. 26;

Fig. 30 is a view like Fig. 27 showing the parts at the "D" stage of Fig. 26;

Fig. 31 is a view like Fig. 27 showing the parts at the "D-1" stage, the stage corresponding to the "D" stage except that the stack is empty instead of higher as in stage "D";

Fig. 32 is a view like Fig. 27 showing the parts at the "E" stage of Fig. 26;

Fig. 33 is a view like Fig. 27 showing the parts at the "F" stage of Fig. 26;

Fig. 34 is a view like Fig. 27 showing the parts at the "G" stage of Fig. 26.

Figure 2:
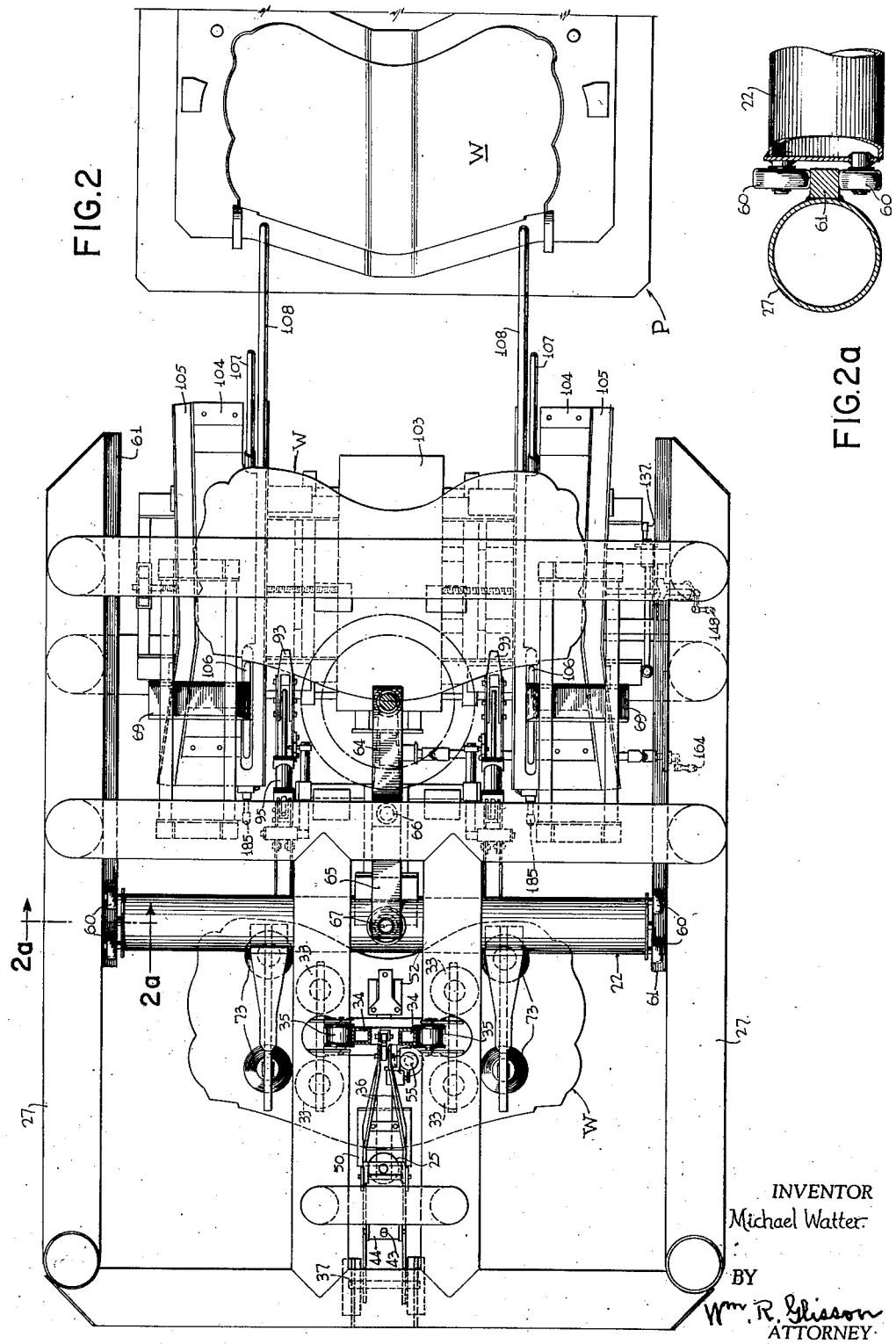
Fig. 2 is a top plan view of the parts shown in Fig. 1 with some parts cut in horizontal section.
Figure 3:
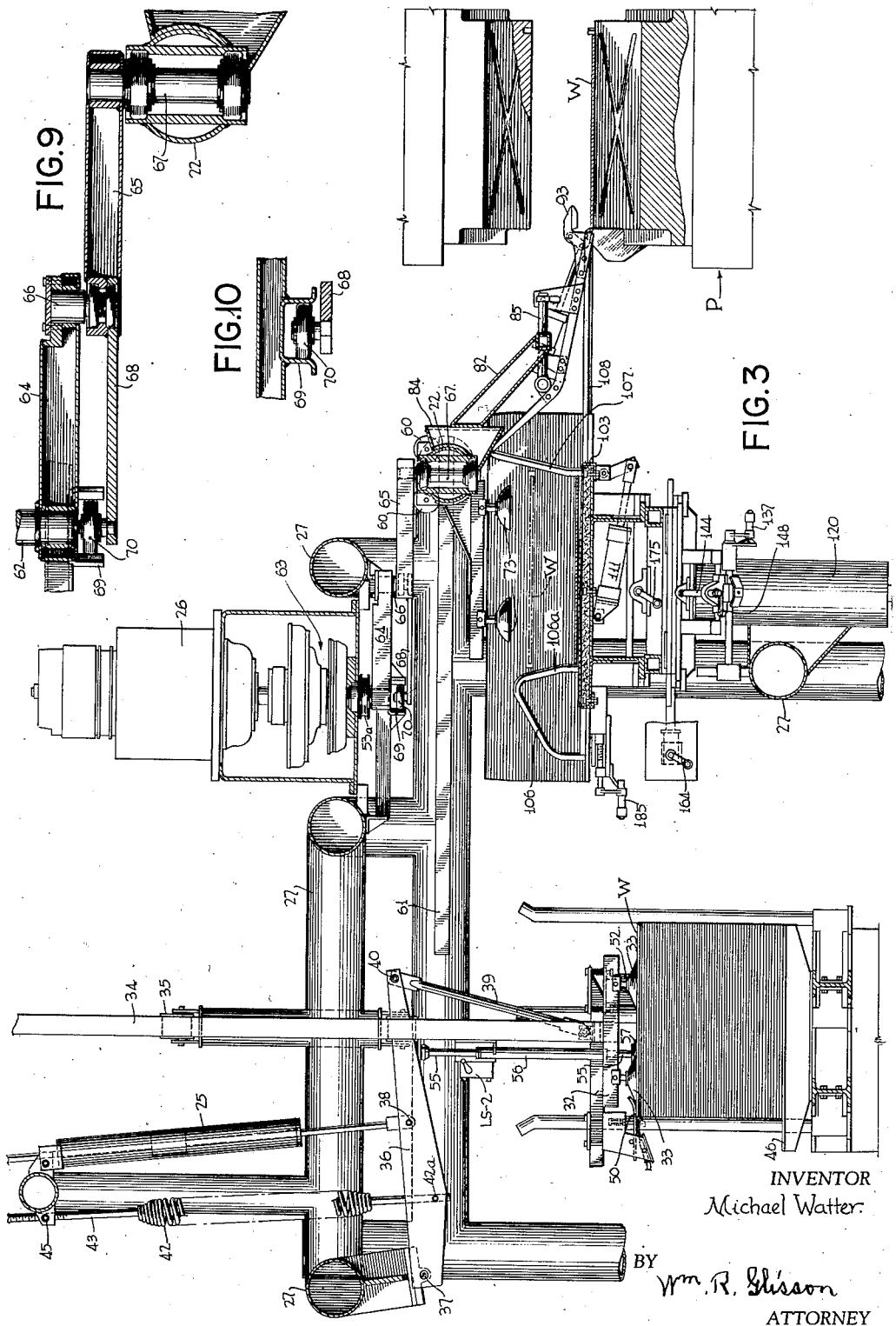
Fig. 3 is a vertical section like Fig. 1 but showing the parts at a different stage of operation.
Figure 4:
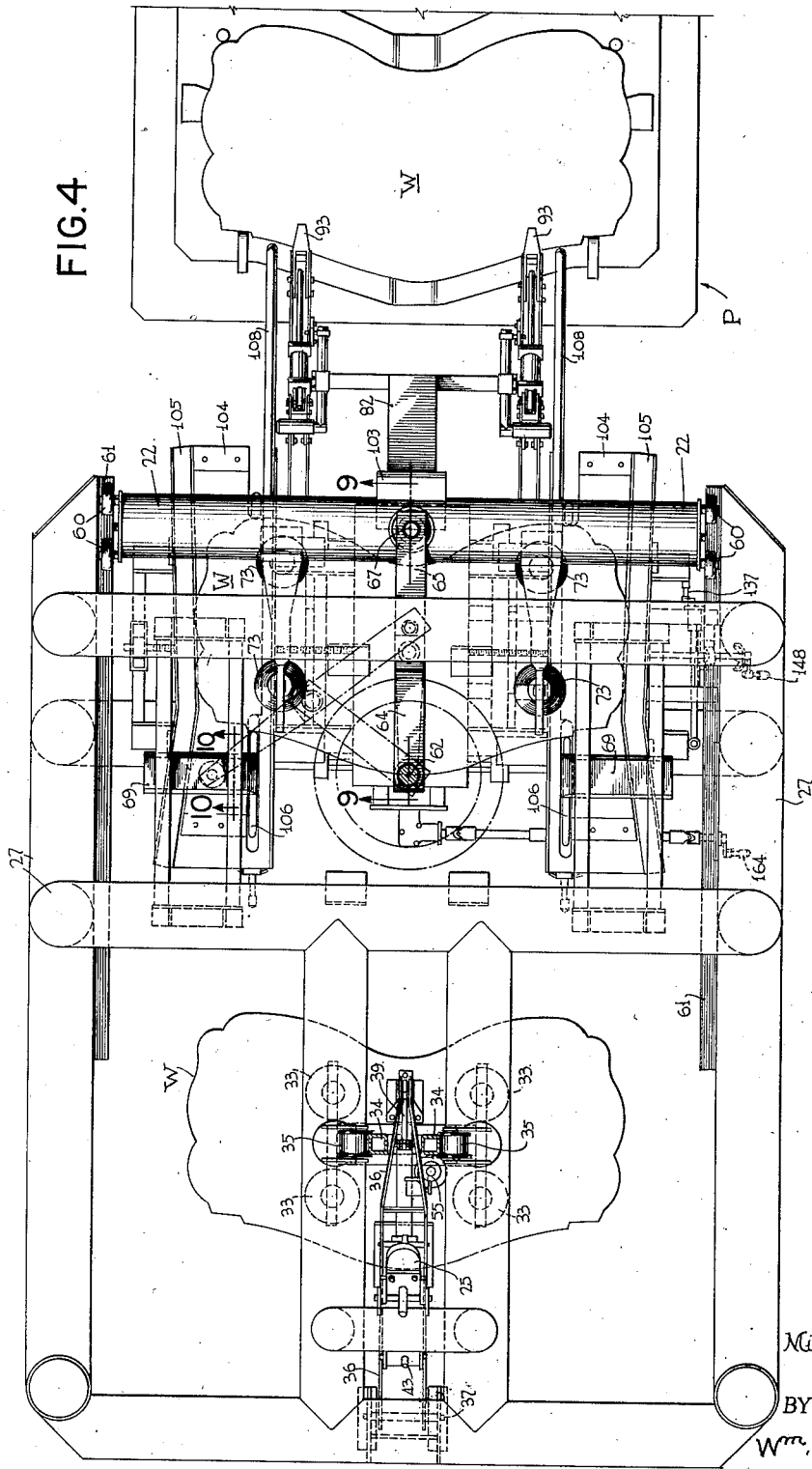
Fig. 4 is a plan view of the parts shown in Fig. 3 with some parts cut in horizontal section.
Figure 5:
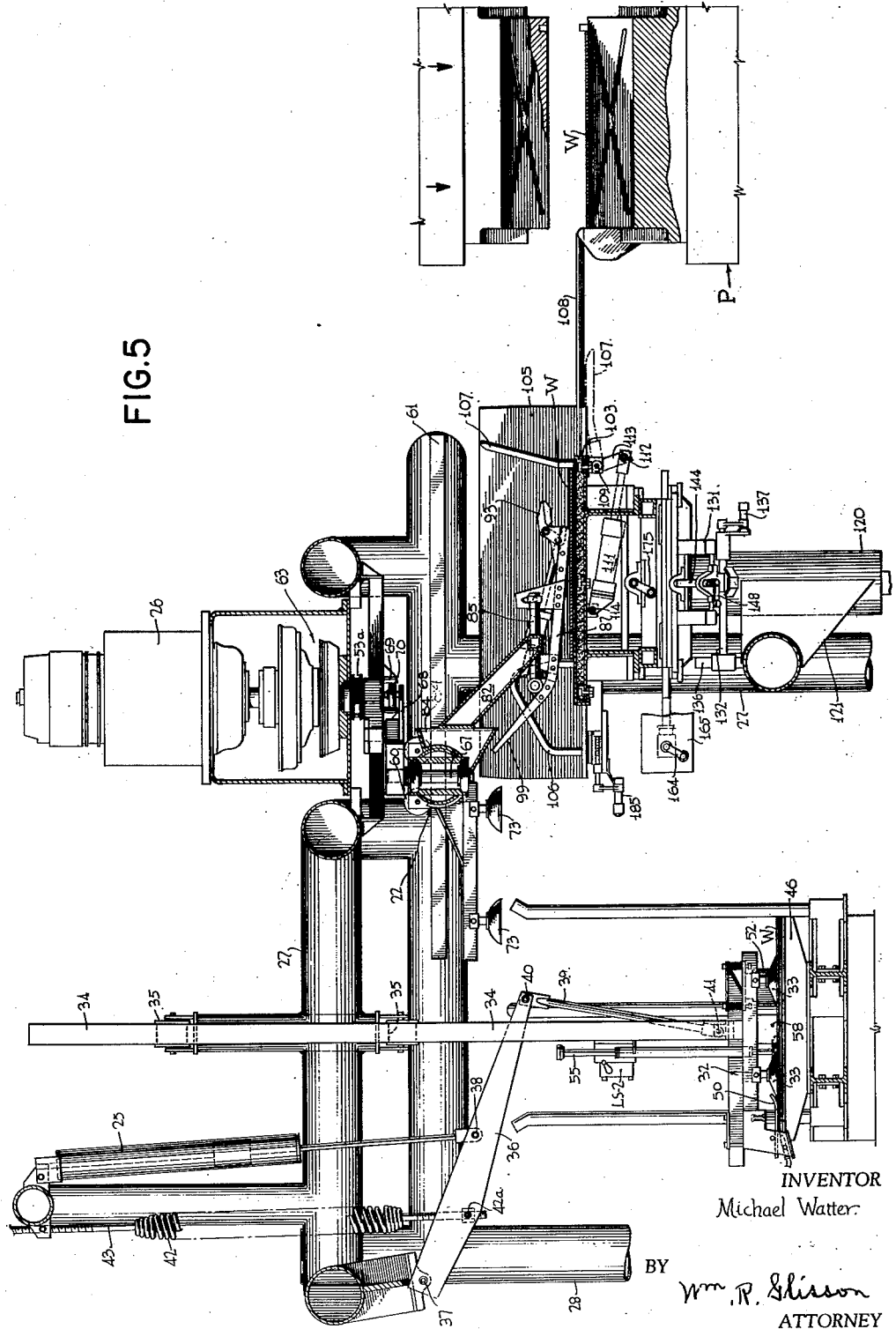
Fig. 5 is a vertical section like Fig. 1 but showing the parts in another stage of operation and also showing an empty-stack condition.

The transfer apparatus provided by the present invention, in the exemplary form, Fig. 1, comprises a lift 20 for adherently engaging the top sheet of a stack of sheets 21 and conveying it to an upper or transfer position, and a carriage 22 for taking a sheet W from the lift and conveying it to a point of use, as to a press P.

At a single forward stroke the carriage by pushout means thereon moves one sheet from an intermediate ready or index station to the press and at the same time by other sheet-engaging means moves another sheet from the lift to the ready station. As the carriage returns, its push-out devices, which fed a sheet to the press, move back past the sheet in the ready position so as to get behind its rear edge ready to push it out on the next forward movement of the carriage. After the carriage returns to the lift end of its stroke its other sheet-engaging means, here suction cups, have a sheet transferred to them from the lift. Between the time when the carriage has moved a sheet clear of the lift zone so the lift can descend and a time just after the carriage returns to the lift zone, the lift will descend to pick up a sheet and move up to transfer it to the carriage suction cups. The carriage-operating means times the action of the lift.

The lift and carriage are separately driven, the lift being moved up and down by a fluid-actuated cylinder-piston device 25 and the carriage being reciprocated by a power unit 26, the power unit including a motor and the necessary gearing to cause the carriage to be moved at the desired speed and also a clutch-brake device to cause the carriage to operate and stop as required.

The mechanism is mounted on a main frame 27 having legs 28 with adjustable feet 29 (Fig. 1a). If desired, the legs may be provided with casters on which the machine can quickly be lifted for transportation, as for moving into operating position for cooperation in a line of machines or for moving out of the way for service or replacement and for service of the machines of the line. It may also be moved by a crane or the like.

The lift 20 comprises a frame 32 carrying suction cups 33 and a long vertical rod or column 34 mounted for reciprocatory movement between guide rollers 35 carried by the frame 27. The lift is operated by the cylinder-piston device through intermediate mechanism which includes a lever 36 mounted on a fixed pivot 37, connected to the piston rod by a pin 38, and connected to the lift by a link 39 which is connected by a pivot pin 40 to the lever 36 and by a pivot pin 41 to the lift rod 34. A heavy coil spring 42 biases the lift to upper position, the spring being pivotally connected to the lever 36 at its lower end at 42a and being adjustably connected at the other end by a threaded rod 43 to a nut 44 which is pivotally connected to the main frame by a pin 45. The spring will pull the lift to the highest position if all power is off, leaving it in a "fail-safe" position where it will not interfere with the movement of the carriage or the introduction of a stack of sheets.

Means, such as a platform 46, are provided for supporting a stack of sheets 21 beneath the lift.

Figure 11:
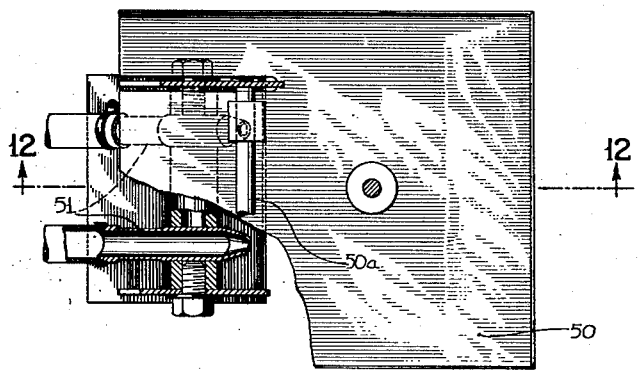
Fig. 11 is an enlarged top plan view, partly in section, showing a device seen at the left side of Fig. 1 for assisting in separating sheets taken from a stack.
Figure 12:
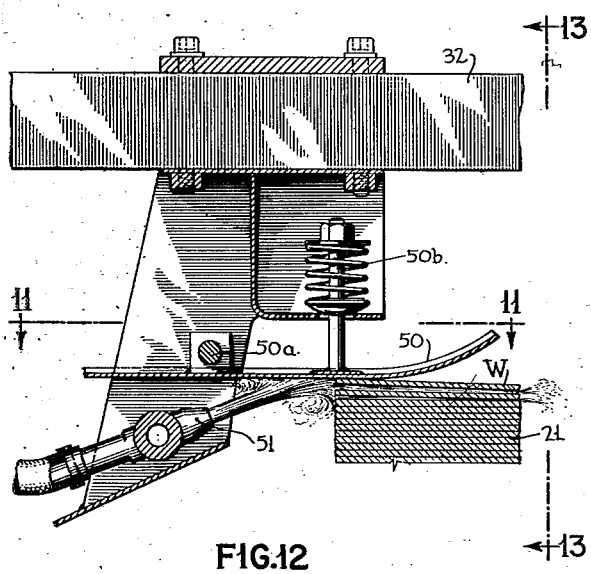
Fig. 12 is a vertical section taken on the line 12—12 of Fig. 11.
Figure 13:
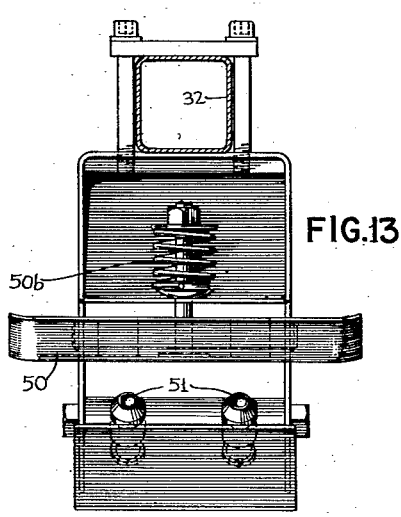
Fig. 13 is a vertical section taken on the line 13—13 of Fig. 12.

The lift is provided with means for separating sheets if they should be stuck together, the means herein provided comprising one or more jet deflector plates 50 of the type disclosed in my copending application Serial No. 304,578. It is sufficient for present purposes to know, and as shown in Figs. 11–13, that an airfoil-shaped deflector plate 50 is pivoted on the lift frame at 50a so as to engage the top sheet of the stack when the lift is lowered and that one or more jets of fluid, such as air, are blown from nozzles 51 along the under surface of the plate at an angle upward toward the top surface of the top sheet of the stack. The movement of the plate is cushioned by a spring 50b.

The lift is also provided with means for detecting the number of sheets in a charge of sheets picked up by the lift cups 33, the detector means here comprising a unit, which has been developed by another, which includes a detector magnet 52 suspended beneath the frame 32 with free tilting movement to fit the top of the stack.

Figure 35A:
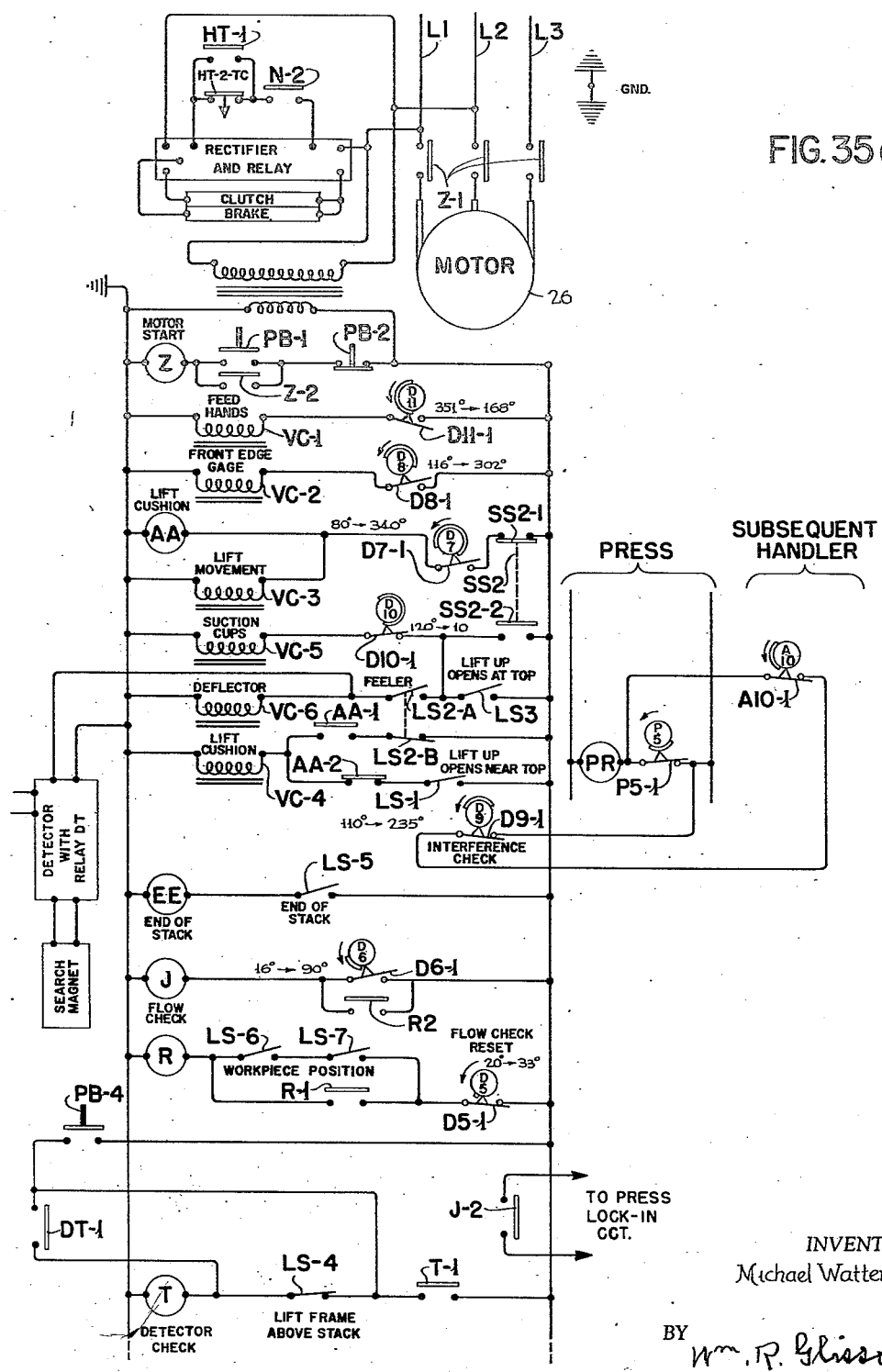
Fig. 35, comprising the parts 35a and 35b, is a wiring diagram.
Figure 35B:
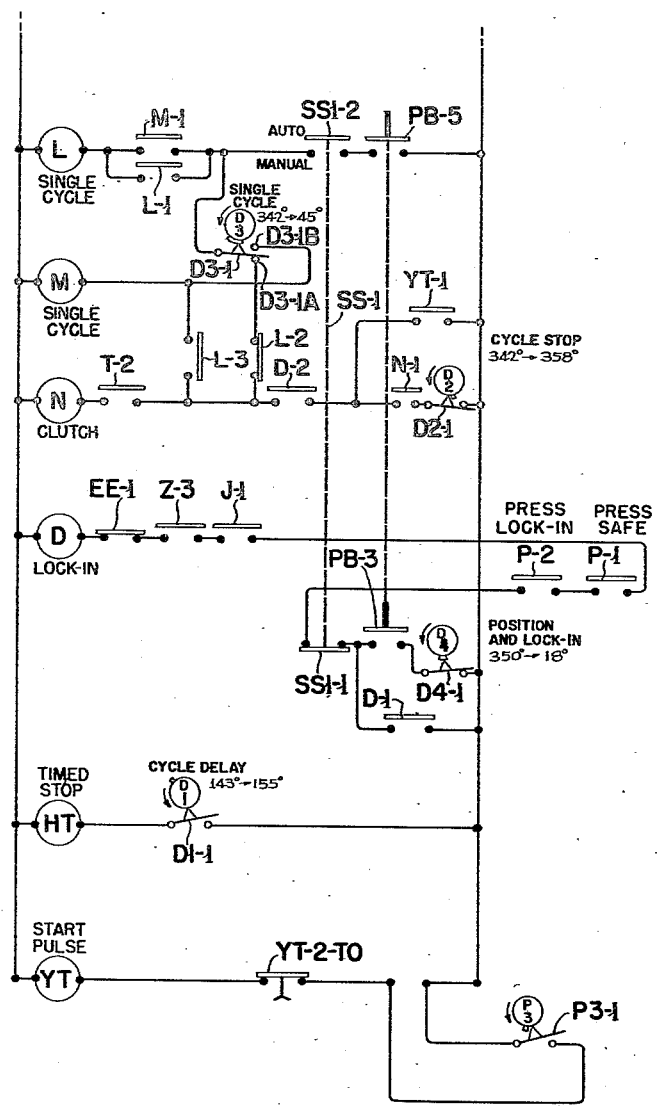

The lift is also provided with means for causing cushioning of the movement of the lift at each end of its stroke while allowing it to move under full power for the major part of its stroke. Since the upper end of the lift movement is a fixed point, the cushioning action at that end can be initiated by the operation of the lift itself as it nears the end of its stroke, for example, by a lift-cam-operated adjustable-position limit switch LS–1 (Fig. 27) which will be functionally considered in the wiring diagram (Fig. 35). At the lower end, the stack height varies from full height to empty, hence the cushion-control operator cannot occupy a fixed position. The means herein provided for establishing the slow-up point on the down-stroke comprises a feeler rod 55 which is slidably mounted in guide means 56 carried by the lift frame so that its foot 57 hangs down a desired distance, say 4 or 5 inches, below the bottom of the suction cups 33. When the foot of the feeler engages the top of the stack, the feeler rod is pushed up relative to the lift frame and operates an adjustable position limit switch LS–2B which through means to be described later causes the stroke to be cushioned at the bottom end.

The feeler action is also utilized for applying air to the deflector plates 50 from the nozzles 51 and also for energizing the circuit of the detector magnet 52.

Means are provided for nullifying the action of the lift-cushioning means after the lift reaches the lower end of its stroke so it can start up at full speed, the means here provided comprising a switch D7–1 which is operated by the cam D7 of a cam shaft 53, indicated in Fig. 27 and by its cams in the wiring diagram, which operates at the same speed as the crankshaft through a positive drive belt 53a, to be described presently, which operates the horizontally moving carriage. The switch D7–1 is the means provided for causing the lift to move down and up.

Means are provided for nullifying the action of the lift-cushioning means after the lift reaches the upper end of its stroke so it can start down at full speed, the means here provided comprising the same limit switch LS–2B which is again operated when the sheet is pulled from under the feeler and which cooperates with other means to be described to produce this result.

The lift is provided with resilient bumper pads 58 for engaging the top of the stack to stop the movement of the lift on the downstroke whereby to avoid injuring the suction cups and other parts carried by the lift frame. Corresponding resilient bumper means are provided for stopping the lift frame at the upper end of its stroke.

Figure 6:
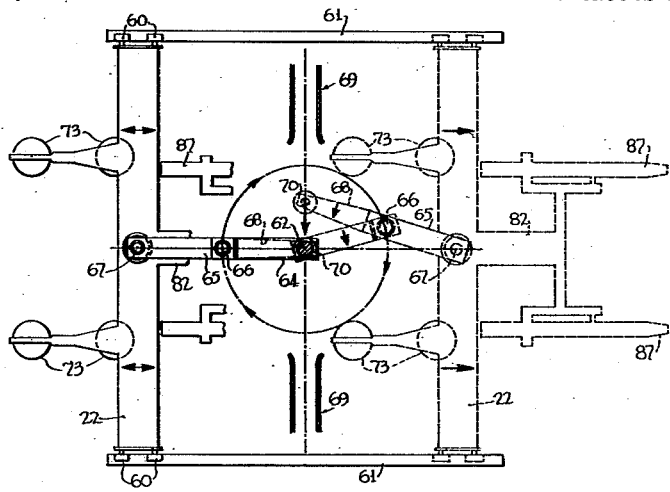
Fig. 6 is a plan view, somewhat diagrammatic in nature, showing the carriage-operating mechanism, the parts being shown about in the Fig. 3 position.
Figure 7:
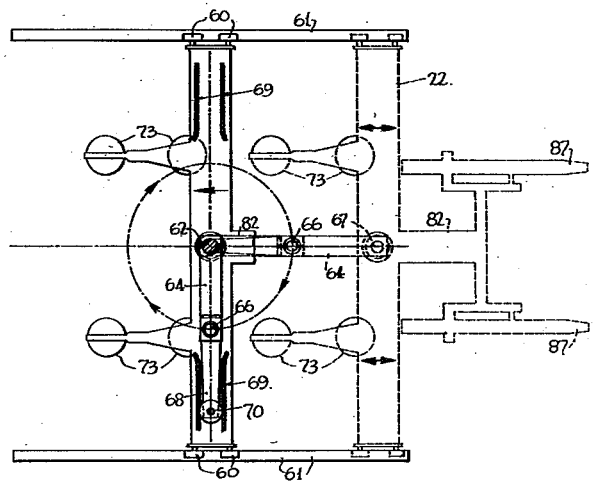
Fig. 7 is a plan view like Fig. 6 but showing the parts about in the Fig. 5 position in solid lines and in the Fig. 3 position in broken lines.
Figure 8:
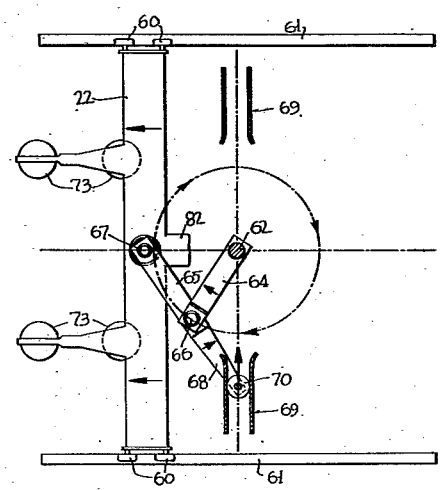
Fig. 8 is a plan view like Fig. 6 but showing the parts approaching the Fig. 1 position.

The horizontally moving transfer carriage 22 is provided with wheels 60 which move on track rails 61 secured to the main frame. The carriage is operated from a crankshaft 62 driven by the power unit 26 through a clutch-brake unit 63. The drive connection between the crankshaft and carriage is of the same general type as that disclosed in my copending application Serial No. 394,397 and includes (Figs. 6–8) a crank arm 64 fast on the shaft, a connecting rod 65 connected by a pin 66 to the crank arm and by a pin 67 to the carriage, a cam arm 68 formed as an extension of the connecting rod, and fixed flared-end cams 69 on a transverse axial line at each side of the axis of the crankshaft adapted to cooperate with a cam roller 70 on the arm 68 to move the carriage past mid-position. The use of fixed cams and the reversely projecting cam arm 68 gives the carriage a more balanced action against twisting than did the prior arrangement wherein the cams were located on the carriage on the sides of the longitudinal center line.

The carriage is provided with suction cups 73 which have their lower ends disposed at an elevation slightly below the highest elevation assumed by the suction cups of the lift when the lift is in its highest position. The sheet is transferred from the lift cups to the carriage cups as the sheet strikes the carriage cups near the upper end of the lift stroke.

Figure 14:
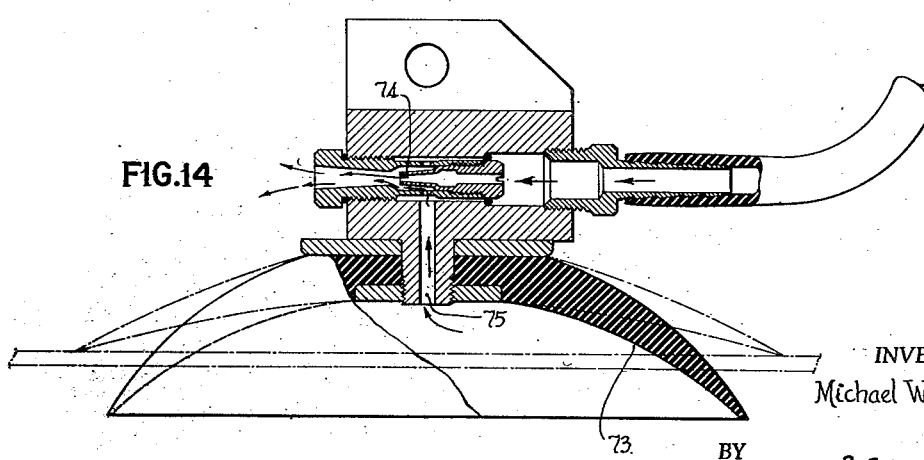
Fig. 14 is an enlarged vertical section through one of the suction cups shown in Fig. 1.

In order to make a controlled rapid transfer in sheet-holding action between the lift cups and the carriage cups and to make all of the cups hold securely when they should, each cup is provided with means for positively inducing the evacuation of air from its interior, the means here shown (Fig. 14) including an air nozzle 74 which blows air past the end of an induction or injector tube 75 leading to the interior of the cup.

The valve means for applying and relieving vacuum at the lift and carriage cups will be described later. For present purposes it is sufficient to note that vacuum must be applied to the lift cups while held upon the top of the stack and maintained after they rise from the stack until the carriage cups take the sheet from them; and that vacuum must be maintained on the carriage cups from the time they take the sheet from the lift cups until they drop the sheet near the outer end of the carriage stroke away from the lift zone.

When the handler is used to supply sheets to an independently powered machine, it is necessary for the handler to pause while the served machine completes its cycle and gives a signal for the handler to serve a new workpiece or sheet. The pause or cycle stop point for the handler is that at which the carriage is at the lift end of its stroke and the lift is at the upper end of its stroke, the carriage cups holding a sheet ready to be moved over and the feeler of the lift resting on the sheet held by the carriage.

Before the lift can descend it is necessary for the carriage to move the sheet clear of the lift zone. When this occurs the feeler will drop down to its lowermost position relative to the lift frame ready to function properly when it engages the top of the stack when the lift descends.

As explained above, the carriage suction cups drop a sheet at a ready or index station. There an adjustable tray, generally denoted by the numeral 80, directs the sheet into a precise position ready to be fed forward by push-out means generally designated by the numeral 81. The push-out means here employed (Figs. 15–19) comprises a T-shaped bracket 82 secured by bolts 83 to a vertical anchorage plate 84 which is secured to the front center of the carriage, as by bolts or welding. The bracket or plate, or both, have a plurality of sets of holes to provide for securing the bracket at selective heights.

At each end of the head bar of the T-shaped bracket 82 there is secured a longitudinally extending bar 85, the securement preferably being by a clamp sleeve 86 providing for longitudinal adjustment of the bar. A pusher arm 87 is provided with an upward extension 88 which is pivoted to a projecting pin 89 carried by the bar 85. On the front side of the bar support the arm 87 is provided with an upward extension 90 which has a slot 91 embracing a support pin 92 carried by the bar 85. This mounting provides vertical movement of the arms 87 about the pivot pins 89 and the vertical movement is limited by the ends of the slots 91 engaging the pins 92.

Each arm 87 at the front end carries a gripper 93 comprising a fixed upper jaw 93b and a movable lower jaw 93a pivoted to the upper jaw by a pin 94. The lower jaw is operated by a cylinder-piston device 95 mounted on a pivot pin 96 of a bracket 97 carried by the arm 87 and pivotally connected to the jaw 93a by a pin 98.

The arms 87 on their rear ends are provided with upwardly inclined projections 99 which ride up on a sheet in the tray, if any part of the sheet fails to lie down properly, to avoid injury to the arms.

The tray 80 at the waiting or index station is provided (Figs. 21–25) with bottom supports 103 and 104, the support 103 being in the middle and the supports 104 being at the sides. Inclined side plates 105 carried by the side supports 104 bring a sheet W into proper lateral position when dropped from the suction cups of the carriage. The plates 105 flare outward at the sheet-entry side to aid in bringing the sheet between the plates. Inclined guide portions 106a formed on rear guide bars 106 bring the rear edge of a dropped sheet into proper position and inclined front guides 107 bring the front edge of the sheet into proper position.

The front guides 107 are mounted to swing down to permit the grippers 93 to push a sheet forward to the press. Rails 108 are provided for supporting the sheet as it is pushed forward. The guides 107 are pivoted on pins 109 carried by brackets 110 secured beneath the side supports 104 and are operated by fluid-actuated cylinder-piston devices 111 each connected at one end by a pivot pin 112 to an arm 113 of the guide and connected at the other end by a pin 114 to a bracket 115 secured beneath a side support 104.

Means are provided for adjusting the tray in various ways to accommodate sheets of various size and shape and in various positions to be fed to the press.

First, it may be desirable to hold the sheets at various elevations to suit the press feed height. For this purpose the entire tray assembly is mounted on a cylindrical pedestal 119 which is telescopically carried in a cylindrical support barrel 120 which is secured through brackets 121 to a cross beam of the main frame 27, as by welding. The pedestal 119 is moved up and down in the barrel 120 by a screw shaft 122 having a hand wheel 123. The pedestal may be locked in adjusted position by locking the hand wheel in position, as by a latch 124 mounted on the barrel and engaging a spoke, and also by a split collar 125 carried on the barrel, as by welding to its upper end at a point, the collar being clamped to the pedestal, as by a bolt 126, opposite the weld point.

It is to be understood that the push-out arms 87 have considerable vertical accommodation at the slot 91, but if the pedestal height is changed much, it will be necessary to bolt the bracket 82 at a different height on the plate 84.

Also, it is to be noted that if major height adjustment of the handler is required, it may be obtained by adjustment of the feet 28. If it is necessary to tilt the handler in any direction to suit the press or for any other purpose, this effect may be produced by adjusting the leg height on one side or end relative to the other side or end; and if angular adjustment of the tray relative to the handler is desired, this may be secured by mounting the entire tray assembly for angular adjustment on the handler frame.

Next, the entire tray head assembly carried on the pedestal 119 may be turned in the barrel 120 after the barrel collar 125 has been loosened. For this purpose the upper end of the pedestal carries a primary frame 130 having a laterally extending arm 131 carrying a rotatable screw shaft 132 in a sleeve 133 pivoted to the arm by a pin 134. The end of the shaft is threaded in a sleeve 135 which is turnably secured to the main frame by a pin 136. The shaft 132 is turned by a hand wheel 137 and held in position by being latched to a plate 138 of the sleeve 133.

Next, means are provided for moving the entire upper tray assembly laterally on the pedestal frame 130, the means here shown comprising a secondary frame 141 mounted upon transverse slide ways 142 of the first frame 130 and retained thereon by suitable means, such as plates 143. The frame 141 is moved by a screw shaft 144 mounted in bearing brackets 145 carried by the arm 131 and threaded in a bracket 146 secured on the frame 141. The shaft comprises two parts connected by a flexible coupling 147. The shaft is turned by a handle 148 and held in adjusted positions by latching to a plate 149 carried by the arm 131.

Next, means are provided for moving the upper tray assembly longitudinally on the secondary frame 141, the means here shown comprising a tertiary frame 152 mounted upon longitudinal slide ways 153 of the second frame 141 and retained thereon by suitable means, such as plates 154. The frame 152 is moved by a screw shaft 155 mounted in a bearing bracket 156 carried by the second frame 141 and threaded in a bracket 157 secured on the frame 152. The end of the shaft 155 is not readily accessible so it is connected by a right-angle drive unit 158, as by bevel gears therein, with a shaft 159 which extends out to the side of the frame 27 where it is turnably mounted in a bracket 160 carried by the frame. The shaft 159 is provided with universal joints 161, 162 and a telescopic joint 163 to accommodate all the movements required between it and the shaft 155. The shaft 159 is driven by a handle 164 which has a latch 165 cooperating with the bracket 160 to hold it in adjusted positions.

Means are provided for moving the side guide plates 105, together with the side supports 104, in and out laterally to accommodate sheets of different transverse length. For this purpose the tertiary frame 152 is provided with slide ways 169 for slides 170 of frames 168 which carry the supports 104, plates 171 being provided for retaining the slides on the ways. The two supports are moved in and out simultaneously but in opposite directions by a shaft 172 mounted in bearings 173 provided on the frame 152 and threaded, right and left, in brackets 174 secured to the frames 168. The shaft 172 is turned by a handle 175 which latches in adjusted positions on a plate 176 carried by one of the frames 168.

The center support 103 of the tray is directly carried by the frame 152.

Means are provided for accommodating sheets of different longitudinal length on the tray, the means herein provided comprising ways 179 on each of the frames 168 for the slide 180 of a frame 181 carrying the rear guide 106. The frame 181 is moved by a screw shaft 182 mounted in a bearing 183 carried by the frame 168 and threaded in a projection 184 carried by the frame 181. The shaft 182 is turned by a handle 185 which is held in adjusted positions by a latch which cooperates with a plate 186 carried by the frame 168.

The operation of the machine, as followed from the above description, the flow diagrams Figs. 26–34, and the wiring diagram, Fig. 35, is as follows:

Motor run

For any given run the carriage drive motor 26 is started and runs continuously. Its clutch 63 is engaged for each cycle of operation and this engagement is dependent on the condition of the press P being fed, if under automatic control, or on a manual impulse if under hand control. The motor is started by pressing a pushbutton PB-1 which energizes a relay Z to close a triple-blade switch Z-1 to start the motor and to close its own lock-in switch Z-2. There are certain safety devices to stop the motor but these are not shown. The motor can be stopped at any time by opening a stop pushbutton PB-2 which deenergizes relay Z.

Stop position

In the zero or stop position the carriage is at the extreme end of its stroke toward the lift and the lift is at the upper end of its stroke with its cups slightly above the cups of the carriage. In normal operation the carriage cups, in the stop position, have a vacuum applied to them and are holding up a sheet. This position is designated stage "A" in Fig. 26 and is shown in Fig. 27.

Carriage controls lift

The operation of the carriage controls the operation of the lift; specifically, cams on cam shaft 53 driven from the carriage crankshaft control the action of the lift.

In automatic, press controls server

The carriage clutch operation is under the supervision of the press being served. Before the clutch can be engaged the press must be in a safe position to receive a sheet, shown by the closure of a switch P-1 in its circuit, and must be ready to run, as shown by the closure of a switch P-2 in its circuit.

Stack-empty switch

Also, before the clutch can be engaged, it must be clear that there are sheets to be fed from the stack. As long as sheets are present a limit switch LS-5 will remain open and a relay EE will remain deenergized and its switch EE-1 will remain closed. The switch LS-5 is closed (Fig. 31) by the lift when it moves down to the point where no more sheets to be fed are present.

Also, a switch Z-3 must have been closed by the relay Z to show that the carriage motor is running.

Flow control

Also, it must be shown that a prior sheet has been fed to the press and that it has been fed evenly. A cam switch D5-1 operated by a cam D5 of the discriminator is kept closed except near the start of a feed cycle (20° to 33°), when it is opened to cancel out the flow check effects of a previously fed sheet. With D5-1 closed at the time when an edge of the sheet is passing the two flow switches LS-6 and LS-7 on the feed rails 108, and if both LS-6 and LS-7 are closed to show that the sheet is fed evenly, this will cause relay R to be energized to lock in on its switch R-1 and close a flow check switch R-2 in the circuit of a relay J. A flow check switch D6-1 in parallel with R-2 in the line to relay J is normally kept open but is closed at a check period (16° to 90°) while the switch D5-1 is opened by its cam D5. If R-2 is not closed, showing the proper feed-in of a workpiece, when D6-1 is opened at 90°, the relay J is deenergized. In normal operation when workpieces are being fed properly, the relay J will be kept energized all the time. Relay J has a switch J-1 in the circuit of the discriminator lock-in relay D and if J-1 is not kept closed the clutch will not be kept engaged.

Server controls press

Relay J also has a switch J-2 in the circuit of the press and if J-2 is not kept closed, the press cannot operate.

Run lock-in

The switches P-1, P-2, EE-1, Z-3, and J-1 are all in the circuit of a lock-in relay D. If they are all closed, and if a cam switch D4-1 operated by cam D4 is closed (closed 350° to 18°), and if a lock-in pushbutton PB-3 is closed, the relay D will be energized. It locks in past PB-3 and D4-1 on its switch D-1.

Detector check

Energization of relay D also closes a switch D-2 in the circuit of a clutch relay N. There is a switch T-2 of a relay T in the circuit of switch D-2 and relay N. Switch T-2 is normally closed but is opened to stop the carriage movement if the detector test try-out does not show the right number of sheets to be picked up by the lift. Relay T is energized by closing a reset pushbutton PB-4 and locks in on its switch T-1. In the circuit of the relay T there is a detector switch DT-1 of a relay DT in the detector circuit of magnet 52, the switch DT-1 being in parallel with a tryout or check limit switch LS-4 which is opened by the lift when it is above the level of the maximum stack height and before it reaches the sheet transfer point. If detector switch DT-1 is not closed when the check switch LS-4 is opened, the relay T is deenergized, the clutch relay N is deenergized, and the clutch is disengaged. However, the circuit of lock-in relay D is not opened and the handler will start again if DT-1 closes to show that the right number of sheets is present and if reset pushbutton PB-4 is closed. Switch LS-4 recloses before the lift reaches the upper end of its stroke, as shown in Fig. 33.

Clutch engaged—press starts it

Relay N is energized by the closure of a switch YT-1 when a relay YT is energized. Relay YT is energized when a momentary make switch P3-1 of the press is closed, indicating that the press is ready for a sheet to be fed into it. Relay YT, when energized, immediately closes switch YT-1 to energize relay N which closes a switch N-2 and engages the clutch. Relay N locks in on its switch N-1. After a time delay, relay YT opens its line switch YT-2-TO ("TO" meaning time delay to open) and becomes deenergized; and since the momentary start switch P3-1 has opened, relay YT will remain deenergized until the start of the next cycle.

Carriage pause at feed end

It is desired that the carriage pause at the forward end of its stroke at the press. To affect this, a discriminator cam D1 closes a switch D1-1 near the forward end of the carriage stroke, i. e., at 143° to 155°. This will energize a relay HT which will immediately close its switch HT-1 and open its switch HT-2-TC ("TC" meaning time delay to close), both at the clutch. Cam switch D1-1 is kept closed only a short time and when it is opened relay HT is deenergized. This immediately causes switch HT-1 to open and disengage the clutch. After a time delay, switch HT-2-TC will close and cause the clutch to be re-engaged.

*Deflector and detector cut off*

In the zero carriage position, when the lift nears its uppermost position, specifically at the time when suction effect is to be shifted from the lift cups 33 to the carriage cups 73, it opens the adjustable-position limit switch LS-3, and the deflector and detector will be cut off. When the carriage pulls the sheet from under the feeler, the switch LS-2A will open and soon after the lift starts down the switch LS-3 is closed, leaving the line ready for the feeler to close LS-2A again to operate the deflector and detector.

*Grippers operated*

Just before the carriage completes its rearward movement toward the lift, a discriminator cam D11 opens a switch D11-1 (opens at 351°, closes at 168°) to deenergize a valve-operating solenoid VC-1 to close the grippers carried by the carriage on a sheet in the index station to carry it to the press. At 168° the grippers open to drop the sheet.

*Gate arms operated*

The gate arms at the front side of the index station will have already dropped down to permit the sheet to pass. The cam D8, which through switch D8-1 and valve-operating solenoid VC-2 causes the gate arms to move down, closes the switch at 302° and opens it at 116°, to allow the arms to rise after the sheet has passed.

*Lift operated*

The cam D7, which through its switch D7-1 and valve-operating solenoid VC-3 causes the lift to move up and down, closes the switch at 80°, after the sheet has moved away from the lift, to cause the lift to descend, and opens it at 340° to cause the lift to rise. The solenoid VC-3, which is operated by switch D7-1, simply reverses the air feed valve to feed air first to one end of the lift cylinder, then to the other, the valve being returned by a spring.

*Lift travel cushioned at each end*

When switch D7-1 is closed, it energizes a relay AA, which closes a switch AA-1 and opens a switch AA-2. A speed control or end-cushioning solenoid VC-4, when energized, fully opens the exhaust line for that end of the cylinder which is connected to exhaust at the main valve, here the lower end, and allows the lift to move down rapidly for most of its stroke. At about 4" from the bottom of the lift stroke, after the feeler engages the top of the stack, the feeler opens a switch LS-2B and deenergizes the solenoid VC-4 to throttle the exhaust line and cushion the end of the stroke. Switch LS-2B is in the line with switch AA-1 which is kept closed from 80° to 340° through the action of cam D7. Switch AA-2 closes when the carriage is at the 340° position where the lift is started up. A limit switch LS-1, which is in the line with AA-2, is closed, hence VC-4 is energized and the exhaust is fully open so the lift can rise rapidly. At 4" from the top of the switch LS-1 is opened to deenergize the solenoid VC-4 and throttle the exhaust line and cushion the end of the stroke.

*Suction cup operation*

The suction cups of the lift and carriage are energized by supplying suction-producing air flow to them in alternation. A cam D10 closes its switch D10-1 at 120° to operate a valve solenoid VC-5 to drop the sheet from the carriage into the index position. At the same time the switching solenoid VC-5 puts suction air on the lift cups which have previously started to descend and may have already engaged the top sheet of the stack. After the carriage is back in position and the lift is at the sheet-transfer position, the adjustable-position switch LS-3 is opened to de-energize the solenoid, which reverses its position by spring action to put suction on the carriage cups and take it off the lift cups. At 10° switch D10-1 reopens while LS-3 is still open, but LS-3 recloses after the lift starts down (at about 80°) ready for D10-1 to be closed to reverse the valve solenoid VC-5.

*Deflector and detector operated*

When the feeler opens the switch LS-2B which causes the descent of the lift to be cushioned, it closes a switch LS-2A, which is ganged with LS-2B, and this, after LS-3 closes when the lift has moved down a short distance, energizes a valve solenoid VC-6 to apply air to the deflector plates to start sheet separation. It also operates a switch to apply current to the circuit of the sheet detector 52. It has already been explained that the lift near the top end of its stroke opens the switch LS-3 to take air off the deflectors and deenergize the detector. The opening of switch LS-3 also causes valve solenoid VC-5 to be deenergized to shift suction from the lift cups to the carriage cups and transfer the sheet from the lift to the carriage, as has already been explained.

*Carriage stopped*

The carriage movement is halted at the end of each cycle by the action of a discriminator cam D2 which opens its switch D2-1 (opens at 342° and recloses at 358°). This opens the circuit to the clutch-engaging relay N to deenergize it.

*Press recycles server*

The discriminator is recycled by the reclosure of the press cam switch P3-1 through relay YT, as before.

*Manual operation*

The above description applies to automatic operation. For manual operation, a selector switch operator SS1 is moved to open a switch SS1-1, which was closed for automatic operation, and to close a switch SS1-2. Now, assuming that the detector relay T is energized to keep its switch T-2 closed, the clutch-engaging relay N will be energized when a run pushbutton PB-5 is closed. The machine may be inched along indefinitely by using pushbutton PB-5. However, to assure a stop at the end of a cycle if the pushbutton PB-5 is held in, the following arrangement is provided.

A cam switch D3-1 is operated by a cam D3 so as to move between a contact D3-1A and a contact D3-1B. The blade of the switch is connected at the joint to the line running to the pushbutton PB-5. At the end of the stroke (342° to 45°) the switch blade engages the contact D3-1A and at all other times (45° to 342°) it engages the contact D3-1B. If a relay switch L-2 is closed when PB-5 is engaged, the clutch relay N will be engaged and the machine will run. At 45° the switch engages contact D3-1B and a relay M is energized. It closes a switch M-1 and a relay L is energized. It locks in on its contact L-1, and closes L-3 and opens L-2. Clutch relay N will continue to be energized because switch L-3 is in a line from the contact D3-1B. When the 342° position is reached, the switch will be cammed to engage contact D3-1A, but since the relay L is locked in and is holding switch L-2 open, the machine stops. It will remain stopped until PB-5 is released to de-energize relay L and close L-2. If now PB-5 is again closed, the clutch relay N will be energized and the cycle will be repeated.

At a certain stage in its cycle the press P opens a switch P5-1 operated by its cam P5 and if a cam switch D9-1 operated by the server cam D9 and a switch A10-1 operated by a cam A10 of a server which takes a workpiece from the press are not closed while P5-1 is open, a relay PR will be left de-energized and the press will be halted until the switches D9-1 and A10-1 have been closed to show that a workpiece has been properly fed into the press, that the prior workpiece has been removed from the press, and that the server parts on both sides of the press have moved clear so the press may be safely operated. Switch D9-1 is closed from 110° to 235° of the server shaft movement; switch P5-1 is open from 16° to 310° of the press cam shaft movement; and switch A10-1 of the other press server is closed from 116° to 233° of the server cam shaft movement.

A selector switch SS2 is provided for causing the carriage to operate without operating the lift. The switch has an upper contact SS2-1 which is in the line with cam switch D7-1 which causes the lift to move up and down in normal operation. When the switch SS2 is moved from its illustrated position this contact SS2-1 is opened so the lift cannot be moved. At the same time that SS2-1 is opened another switch SS2-2 is closed. Switch SS2-2 is in the line with switch D10-1 which is closed in the rest position (opens at 10°) in a circuit which was open at LS-3, hence when SS2-2 is closed it causes the solenoid VC-5 to be energized to drop the sheet held by the carriage cups (if such a sheet is present) to be released to drop back upon the stack. The carriage can now be put through its cycle without causing operation of the lift.

All of the rotary cams D1, D2, etc. are of a known type which provides ready adjustment of the make and break points, hence while the points of action of the various cams have been given in specific degrees for purposes of clarity in the description, it will be understood that these figures are not rigidly fixed and that adjustment may be made to suit the required conditions for smooth operation. Such factors as speed, air pressure, inertia, cup attachment and release and the like must be taken into consideration and these factors may vary for different reasons so that it is not possible to determine what settings to make in many cases except by trial and adjustment.

The action depicted in the flow diagram, Fig. 26, and the related parts-position diagrams, Figs. 27 to 34, can be understood from an inspection of these figures and the description already given. However, a general explanation may be helpful.

The upper half of Fig. 26 shows the movement of parts in a horizontal direction and the lower half of the view shows the movement in a vertical direction. The ordinate or distance in a vertical direction in the view measures workpiece movement and abscissa or the distance horizontally measures time.

At the "A" stage, shown at the left of Fig. 26 and in Fig. 27, it is assumed that the press (at the top) is ready for its associated handlers to operate and the handlers are at rest but ready to begin action. A first workpiece W, designated "a," is in the press; a second workpiece "b" is in the ready or "on-deck" index station and held by the grippers 93 and the gate guides 107 have been swung down out of the way; and a third workpiece "c" is being held up by the carriage cups 73. The lift cups 33 are held up above the carriage cups 73. Fig. 27 shows that the cushioning solenoid VC-4 is still de-energized because the feeler foot 57 is still resting on a workpiece to keep LS-2B open and relay switch AA-1 is open; lift solenoid VC-3 is deenergized because cam switch D7-1 is open and the valve is supplying air to the bottom end of the cylinder to hold the lift at the top; the detector is off and the deflector solenoid VC-6 is de-energized to keep air from the deflector because the lift-cam-operated limit switch LS-3 is open; the cup air solenoid VC-5 is de-energized to keep air on the carriage cups 73 and off the lift cups 33 (a fail-safe arrangement) because the limit switch LS-3 is open; and the flow limit switches LS-6 and LS-7 (shown in Fig. 35a but not elsewhere because they are located along the rails 108 where they are hard to show physically) are open and R-1 is closed.

At the "B" or 180° stage shown next right in Fig. 26 and in Fig. 28, the sheet "a" has been taken from the press by a subsequent handler (or manually, if there is no pull-out handler); sheet "b" has been carried into the press; sheet "c" has been carried by the carriage cups 73 to a position over the index station and dropped and the front guides 107 are up; and the lift is moving down, having been started down at about the 80° carriage position by the closure of cam switch D7-1. The cushion solenoid VC-4 has been energized by closure of LS-2B and AA-1 to allow full exhaust and rapid descent of the lift; the solenoid VC-3 has been energized by closure of D7-1 to cause the lift to descend; the detector and deflector are still off for while LS-3 is closed, LS-2A is open; vacuum solenoid VC-5 has been energized (by closure of LS-3 and later closure at 120° of D10-1) to put vacuum on lift cups 33 and take it off carriage cups 73; and flow switches LS-6 and LS-7 have been closed by the passage of sheet "b" along the rails to energize relay R and close switch R-2 before check switch D6-1 opened (at 90°) and keep it closed until D6-1 closes again (at 16°).

At the "C" stage, Fig. 29, the lift feeler foot has engaged the top of the stack. This point will vary considerably as the stack height varies but will occur somewhere on the downwardly sloping line shown near the left and bottom of Fig. 26. The situation selected for Fig. 29 is a "full-stack" condition. The feeler has operated switch LS-2 to close LS-2A and open LS-2B. Since LS-3 was opened soon after the lift started down, the closure of LS-2A will energize the detector and the deflector air-on solenoid VC-6. The opening of LS-2B will de-energize VC-4 and throttle the exhaust and cushion the further descent of the lift.

At the "D" stage of Fig. 30 the lift cups 33 have engaged a sheet "d" and the deflector and detector are active to assure separation and check of the sheet charge to be lifted.

The "D1" stage of Fig. 31 is the same as the "D" stage of Fig. 30 except that an "empty-stack" condition is shown where limit switch LS-5 is actuated to break the lock-in circuit at switch EE-1 and stop operation until a new stack has been introduced. The cycle can be completed by manual operation (of SS1 and PB-5), as explained, to raise the last sheet and transfer it to the carriage cups ready for a new cycle.

The press begins to act on the sheet "b" shortly after the "D1" stage when the feed grippers of the carriage are retracting. The period of press activity is shown by the double cross-hatched lines at the top and middle of Fig. 26 under the legend "press in action." During this time the carriage is returning and at about 340° the switch D7-1 is opened to cause the lift to rise. Switch AA-2 closes and since limit switch LS-1 is closed, the buffer solenoid VC-4 is energized to cause rapid downward movement of the lift.

At the "E" stage of Fig. 32 the lift has raised sheet "d" to a point where check switch LS-1 is opened to de-energize VC-4 and cushion the lift movement. Limit switch LS-4 has been closed to apply the detector check of switch DT-1 to determine that the correct sheet charge has been separated and lifted. There is adjustment of LS-4 so the check point can be shifted if required.

At the "F" stage of Fig. 33 the sheet "d" is being exchanged. Here the switch LS-3 has been opened to shift suction from the lift cups to the carriage cups; also to cut off the detector and deflector. The carriage has returned to its 0° position and stopped and its grippers have grasped a sheet "c" at the index station, gate guide 107 having been lowered.

The ascent of the lift to the top end of its stroke ends the handler cycle. This is a variable time dependent on the height of the stack. After that there is a time delay after the press ram starts up before a new handler cycle starts. This time lapse is indicated on Fig. 26 between the "G" position and the heavy vertical "Start cycle" line on the right.

Part of a new cycle is shown to the right of this "Start cycle" line.

It is thus seen that the invention provides improved apparatus for handling workpieces to serve related machines or requirements.

While one embodiment of the invention has been disclosed for purposes of illustration, it is to be understood that there may be various embodiments and modifications within the general scope of the invention.

What is claimed is:

1. Article transfer means, comprising in combination, a vertically movable lift, a first power device for operating said lift, a horizontally movable carriage, a second and independent power device for operating said carriage, means controlled through said carriage power means for starting said lift downward after said carriage has moved away from the lift zone, means for starting said lift upward when said carriage has returned to the lift zone in a position to have an article exchanged from the lift to the carriage, article holding means on said lift and on said carriage, means controlled by the carriage power means for controlling said holding means to cause the carriage holding means to drop an article at a position where the carriage is disposed away from the lift zone, means for causing the lift holding means to pick up an article when the lift is in a lowered position, and means controlled by said lift movement at the exchange point for causing the lift holding means to release an article and for causing the carriage holding means to take the article at the exchange position, said transfer means further including second article holding means on said carriage, an index station with a movable gate where articles are deposited by said first carriage holding means and pushed out by said second carriage holding means, article detecting means for said lift, article separating means for said lift means controlled through the action of said carriage power device for controlling the action of said movable gate and said second holding means on the carriage, and means controlled through the action of said lift power device for controlling the action of said detecting means and said article separating means.

2. Sheet handling means comprising in combination, means for supporting a stack of sheets, lift means having reciprocatory movement for engaging a top sheet of the stack and lifting it, power means having a length of stroke sufficient to carry said lift means to the bottom of the stack, and means for applying a decelerating influence upon the movement of the lift means by the power means as it comes near the top of the stack, said decelerating means including a feeler mounted on the lift means in a position to engage the top of the stack a short distance ahead of said lift means, and means controlled by the feeler for reducing the speed of action of said power means.

3. Sheet handling means comprising in combination, means for supporting a stack of sheets, lift means having vertically reciprocating means for engaging a top sheet of the stack and lifting it, power means for said lifting means having a length of stroke sufficient to carry said lift means from an upper transfer position to the bottom of the stack, means for applying a decelerating effect upon the movement of the lift means as it comes near the top of the stack, said decelerating means including a feeler mounted on the lift means in a position to engage the top of the stack a short distance ahead of said lift means, and means for applying a decelerating effect upon the movement of the lift means as it comes near the upper end of its travel.

4. Sheet handling means comprising in combination, means for supporting a stack of sheets, lift means having vertically reciprocating means for engaging a top sheet of the stack and lifting it, power means for said lifting means having a length of stroke sufficient to carry said lift means from an upper transfer position to the bottom of the stack, means for applying a decelerating effect upon the movement of the lift means as it comes near the top of the stack, and means for applying a decelerating effect upon the movement of the lift means as it comes near the upper end of its travel, said power means comprising a fluid actuated cylinder-piston device, and said means for applying a decelerating effect comprising an exhaust throttling device acting against the active piston moving fluid, a feeler moving ahead of the lift to engage the top of the stack and operate the exhaust throttling device on the down movement, and a limit switch operated by said lift means on the upstroke for operating the exhaust throttling device.

5. Sheet handling means comprising in combination, means for supporting a stack of sheets, sheet lift means movable toward and from the top of the stack to pick a sheet charge off the stack, sheet separating means mounted to move with said lift means for removing excess sheets if any from the charge taken from the stack, means for starting said sheet separating means into action at about the time said lift means engages the stack, detecting means for checking the number of sheets in a charge at a point along the upward travel of the lift and stopping the action of the machine if the proper charge is not present, and means for stopping the action of said sheet separating means after the detector check point when said lift means has moved upward to a point near the upper end of its stroke.

6. Sheet handling means comprising in combination, means for supporting a stack of sheets, sheet lift means movable toward and from the top of the stack to pick a sheet charge off the stack, sheet separating means for removing excess sheets if any from the charge taken from the stack, detecting means for gaging the number of sheets in a charge and giving a signal when no more than a predetermined number is present, means for starting said sheet separating means and said detecting means into action at about the time said lift means engages the stack, cycle control means for stopping the movement of said lift means at a predetermined point in its movement away from the stack if said detector means has not given an indication of the presence of the desired number of sheets in the charge, and means for stopping the action of said sheet separating means and said detecting means by further movement of the lift after said cycle control means and detecting means have tested the charge lifted.

7. Sheet handling means comprising in combination, sheet lift means for raising a sheet charge upward, carriage means for taking a charge from said lift means and moving it laterally, means for adherently holding a sheet charge on said lift means, means for adherently holding a sheet charge on said carriage means, means for coordinating the action of said lift means and said carriage means to cause the lift means to move down at a time after said carriage means has moved a sheet charge away from the lift means and to cause the carriage means to move away at a time after the lift means has moved up past the position of transfer to the carriage means, and means for causing the adherent means of the lift means and carriage means to be energized in alternation first from the carriage to the lift when the carriage has taken a sheet to a discharge point and second from the lift to the carriage as the lift holding means pass the carriage holding means on their way up.

8. Sheet handling means comprising in combination, sheet lift means for raising a sheet charge upward, carriage means for taking a charge from said lift means and moving it laterally, vacuum means for adherently holding a sheet charge on said lift means, vacuum means for adherently holding a sheet charge on said carriage means, means for coordinating the action of said lift means and said carriage means to cause the lift means to move down after said carriage means has moved a sheet charge away from the lift means and to cause the lift means to be moved up past a position of sheet transfer to the carriage means after the carriage has moved back to the sheet transfer position, and means for causing the vacuum means of the lift means and the carriage means to be energized in alternation first from the carriage to the lift when the carriage has taken a sheet to a discharge point and second from the lift to the carriage as the lift holding means pass the carriage holding means on their way up.

9. Sheet handling means comprising in combination, means for conveying and dropping a sheet, a tray for holding the sheet when dropped, guide means on the sides of the tray for directing the sheet down into proper position, means for moving said guide means for accomodating sheets of different size, means for shifting said tray laterally, longitudinally, or turning it about a vertical axis, and means for changing the elevation of the tray.

10. Sheet handling means comprising in combination, means for conveying and dropping a sheet, a tray for holding the sheet when dropped, tapered guide means on the sides of the tray for directing the sheet down into the proper position, means for moving the lateral guides in and out to accommodate sheets of different transverse length, means for moving the front guides up and down to first position a sheet and then permit it to escape in a forward direction, and means for adjusting the rear guides longitudinally relative to the front guides to accommodate sheets of different longitudinal length.

References Cited in the file of this patent

UNITED STATES PATENTS

| | | |
|---|---|---|
| 1,145,405 | Cheshire | July 6, 1915 |
| 1,480,012 | Roden | Jan. 9, 1924 |
| 1,608,296 | Blaine | Nov. 23, 1926 |
| 1,625,085 | Leach | Apr. 19, 1927 |
| 1,816,319 | Eksergian | July 28, 1931 |
| 2,524,846 | Socke et al. | Oct. 10, 1950 |
| 2,597,687 | Upham | May 20, 1952 |
| 2,659,237 | Wood | Nov. 17, 1953 |
| 2,711,101 | Watter | June 21, 1955 |
| 2,723,069 | Shanhouse et al. | Nov. 8, 1955 |